(No Model.)

P. NOW.
HOSE SUPPORTER.

No. 533,826. Patented Feb. 5, 1895.

Attest:
A. N. Jesbera
A. Tidder

Inventor:
Paul Now
by William B. Greeley
Att'y.

UNITED STATES PATENT OFFICE.

PAUL NOW, OF LANCASTER, ASSIGNOR OF ONE-HALF TO THOMAS BURNS, THOMAS S. DAVIS, AND A. M. DAME, OF CLINTON, MASSACHUSETTS; WALTER R. DAME ADMINISTRATOR OF SAID A. M. DAME, DECEASED.

HOSE-SUPPORTER.

SPECIFICATION forming part of Letters Patent No. 533,826, dated February 5, 1895.

Application filed August 15, 1894. Serial No. 520,361. (No model.)

*To all whom it may concern:*

Be it known that I, PAUL NOW, of Lancaster, in the county of Worcester and State of Massachusetts, have invented certain new and useful Improvements in Hose-Supporters; and I do hereby declare that the following is a full and exact description thereof, reference being had to the accompanying drawings, and to the letters of reference marked thereon, making a part of this specification.

After fire-hose has been used it is necessary to drain and dry it thoroughly in order to prevent its rapid deterioration. This draining and drying is most conveniently effected by hanging the hose vertically in a tower of suitable height, the lengths of hose being doubled up and down. If the bend of the hose at the top is hung upon a single narrow support it sooner or later cracks at that point and the durability and life of the hose are thereby much diminished. Various devices have been produced heretofore which would support the hose properly at its upper bend but they have been unnecessarily cumbersome and expensive and consequently have not come into common use.

It is the object of my invention to provide a device for this purpose which shall be inexpensive, simple and durable in construction and so compact as to allow many lengths of hose to be hung up in the drying tower at the same time.

The construction of the improved device will be particularly described hereinafter.

Figure 1:
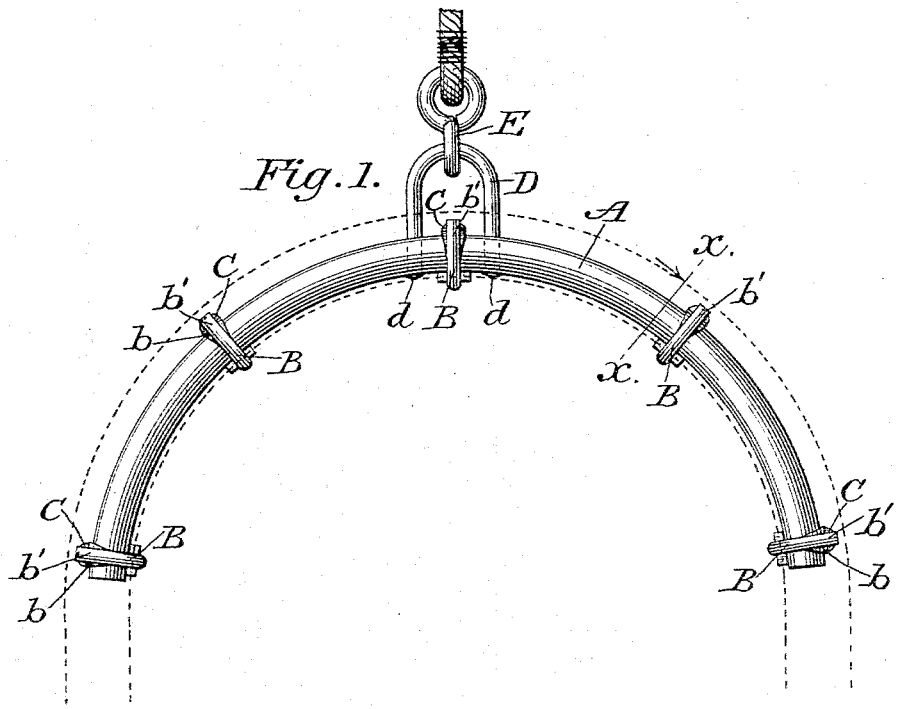
Figure 2:
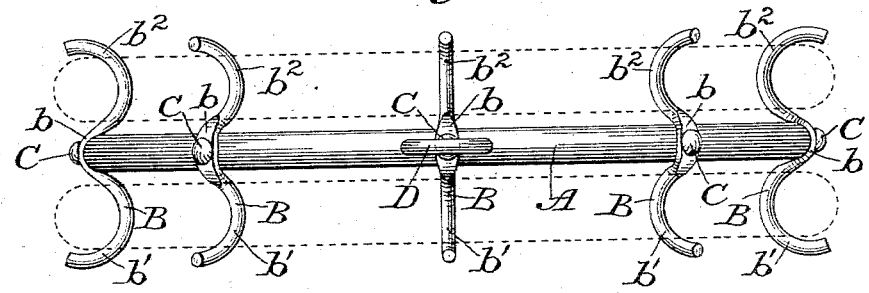
Figure 3:
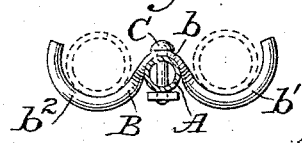

In the accompanying drawings, in which the improved device is illustrated: Figure 1 is a side view of the device in position for use, the hose being indicated thereon by dotted lines. Fig. 2 is a plan view of the same, the hose also being indicated by dotted lines. Fig. 3 is a section on the line $x—x$ of Fig. 1, looking in the direction of the arrow.

In constructing my improved support a rod or bar A is bent in the arc of a circle, the radius of curvature being such as to give the hose the proper curvature where it rests upon the support to permit the water to drain off readily and the air to circulate without making any abrupt bends which would tend to crack the hose.

As indicated in Fig. 3 the rod A is preferably hollow for the sake of securing lightness with rigidity, a piece of ordinary iron pipe, such as gas pipe, being suitable for this purpose. Upon the bent rod A are secured at intervals yokes B, B. Each yoke is formed of a short rod of suitable thickness bent in the form clearly represented in Fig. 3. The middle portion of the yoke is flattened, as at $b$, and is curved to fit closely upon the rod A where it is secured in place by a rivet or bolt C which is passed through the flattened portion $b$ of the yoke B and through the rod A. Each yoke B thus furnishes two hooks $b'$, $b^2$, one at each side of the rod or back-bone A so that two lengths of hose, as indicated in Fig. 2, may be laid upon the support and held close together side by side whereby not only is no unnecessary space taken up by the support or by the hose itself but the several lengths of hose are kept distinct and separate so that if several supports with their hose are hung in the tower any one support and its hose may be readily selected from the rest and lowered without disturbing the rest. The curve of each hook $b'$, $b^2$, corresponds to the circumference of the hose itself and the bearing of the hose thereon is therefore so distributed as to reduce to a minimum the possibility of the hose collapsing and so preventing the circulation of air through the same. For the same reason the hooks are distributed over the arc described by the back-bone A so that the weight of the hose shall not come on any one hook.

A staple or eye D is secured to the middle part of the rod or back-bone A by passing its shank or shanks through the said rod A and swaging the ends as indicated at $d$ in Fig. 1, or by a nut if preferred. The eye forms a convenient point of attachment for a hook E and tackle by which the support with its hose may be hoisted in the tower.

I am aware that hose supports for the same general purpose have been devised heretofore but my support is distinguished therefrom by its structural characteristics and is superior to any support known to me in point of simplicity, cheapness, durability and convenience and efficiency in use.

I claim as my invention—

1. The herein described support for draining and drying hose, the same comprising a rod curved substantially in the arc of a circle, an eye secured to said rod by means of which it may be raised, and yokes secured at intervals to said rod and forming on each side of said rod a series of hooks to receive on each side a length of hose, substantially as shown and described.

2. The herein described support for draining and drying hose, the same comprising a rod curved substantially in the arc of a circle, an eye secured to said rod by means of which it may be raised, and a series of yokes adapted to be secured to said rod at intervals, each of said yokes being formed of a rod flattened and bent at its middle to partly embrace said rod, and a bolt or rivet passed through the flattened portion of each yoke and through the rod to hold the yoke in position on said rod, whereby a series of hooks, each conforming to the circumference of the hose is formed on each side of said rod to receive a length of hose, substantially as shown and described.

In testimony whereof I have signed my name to this specification in the presence of two subscribing witnesses.

PAUL NOW.

Witnesses:
A. JUDSON LAYTHE,
GEORGE S. GIBSON.